July 27, 1937.　　　M. H. ROYSTON　　　2,088,141
ROTARY CULTIVATOR
Filed Feb. 4, 1936　　　3 Sheets-Sheet 1

Inventor:
Matthew Henry Royston,
By Potter, Pierce & Scheffler,
Attorneys.

July 27, 1937.  M. H. ROYSTON  2,088,141
ROTARY CULTIVATOR
Filed Feb. 4, 1936  3 Sheets-Sheet 2
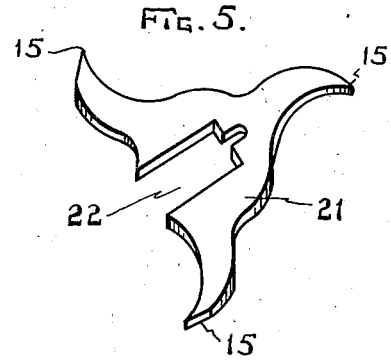
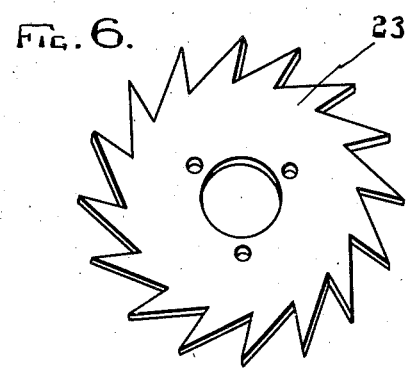
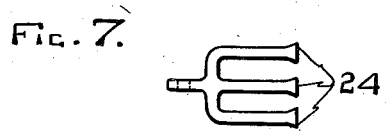
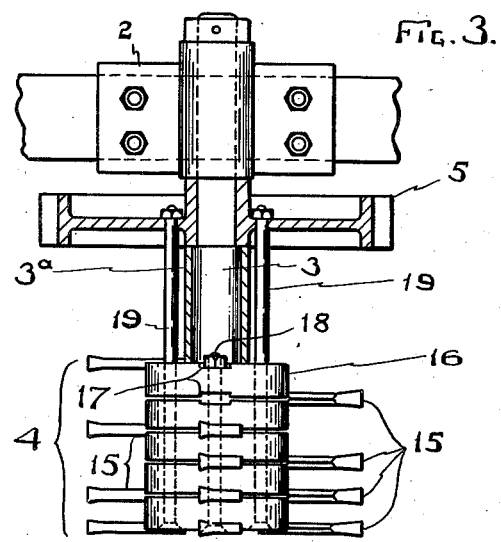
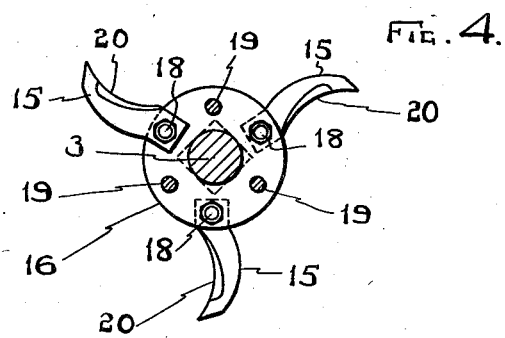
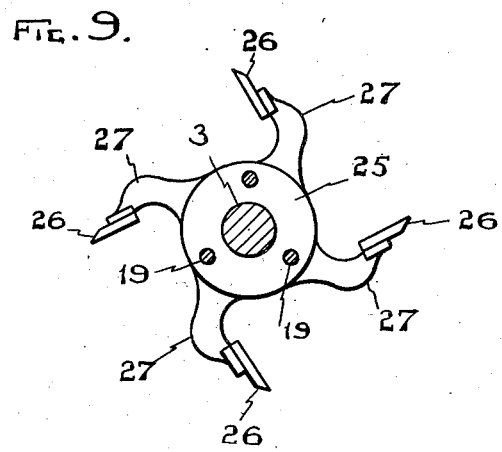
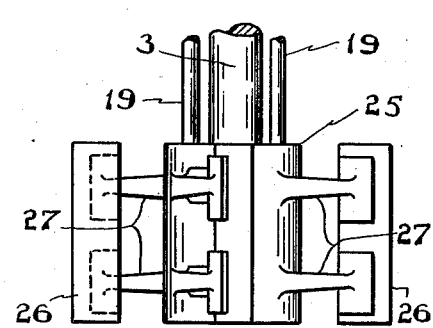

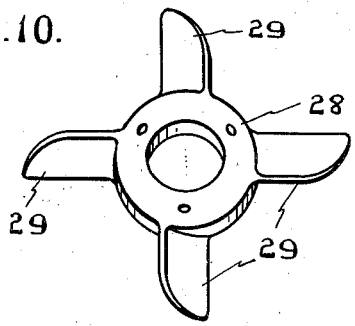
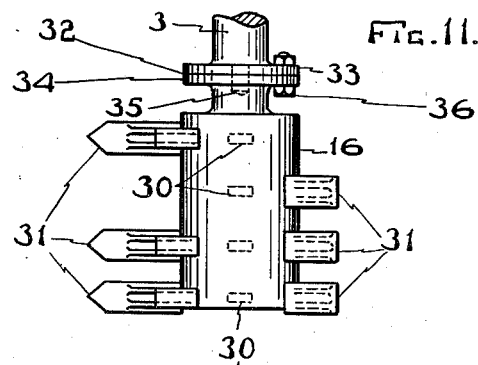
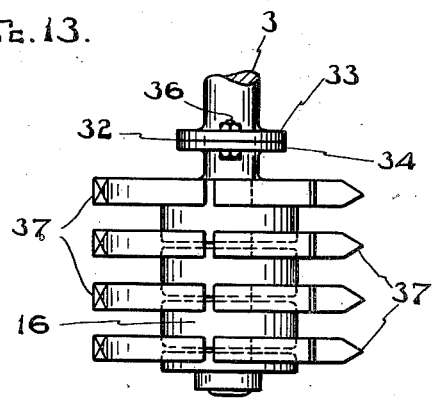
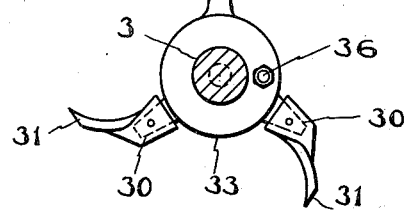
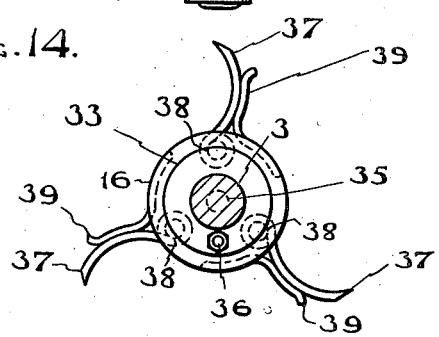
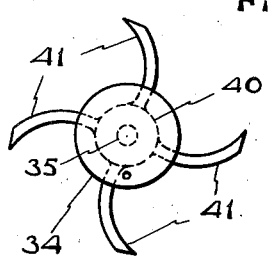
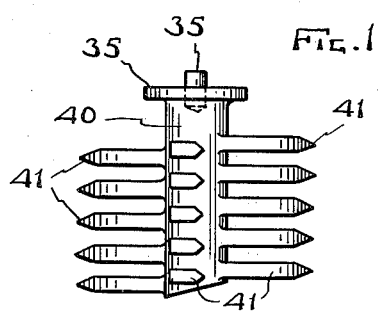
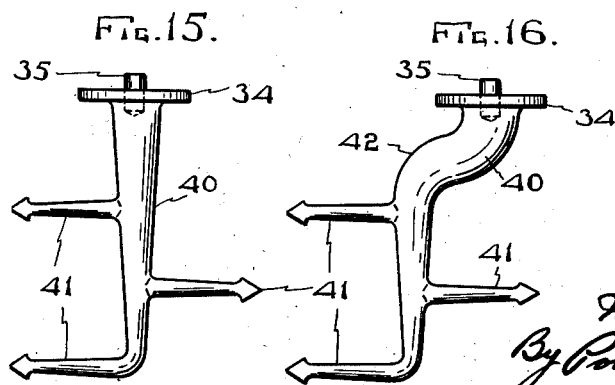
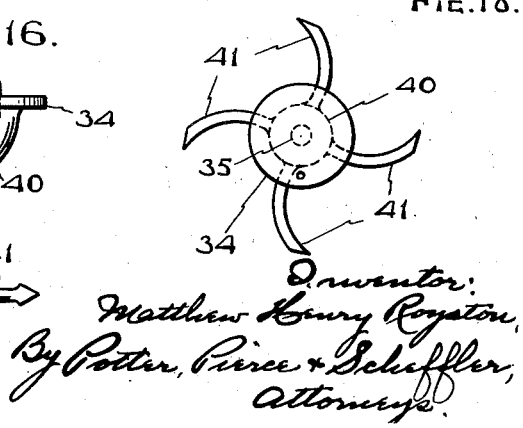

Patented July 27, 1937

2,088,141

UNITED STATES PATENT OFFICE 2,088,141

ROTARY CULTIVATOR

Matthew Henry Royston, Leeds, England, assignor to Radial Tillers Limited, Leeds, England, a company of Great Britain and Northern Ireland Application February 4, 1936, Serial No. 62,342
In Great Britain July 5, 1935

6 Claims. (Cl. 97—43)

This invention relates to rotary land cultivators or tilling machines of the self-propelled type or capable of being hauled by animals, tractors or cable hauling machines.

Various rotary tilling machines have been constructed but some little difficulty has been experienced in obtaining satisfactory cultivation of the land and a good tilth for the growth of crops, more especially in medium, medium heavy, and heavy soils. For example, the desired speed for the tilling tools has not always been possible owing to the construction of the machine, neither has the required grade of soil been provided by the tilling tools in use. In this respect no provision has been made to obtain a fine, medium, or coarse tilth throughout the working depth, or any of these, in any portion of the depths.

The object of this invention is to provide an improved rotary tilling machine capable of obviating the above difficulties.

Referring now to the accompanying drawings in which several embodiments are shown by way of example only:—

Figs. 3 and 4 are respectively a side elevation and a plan of a rotary tilling tool construction;

Figs. 5 to 18 show various modified kinds of tilling tool constructions.

Like parts in all the views are marked with similar reference numerals.

Figure 1:
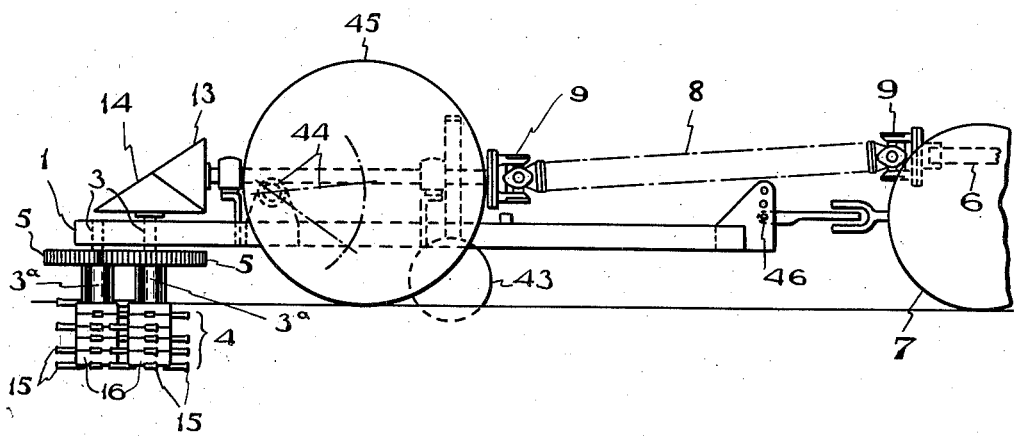
Figs. 1 and 2 are respectively a side elevation and a plan outline arrangement of the improved rotary tilling machine.
Figure 2:
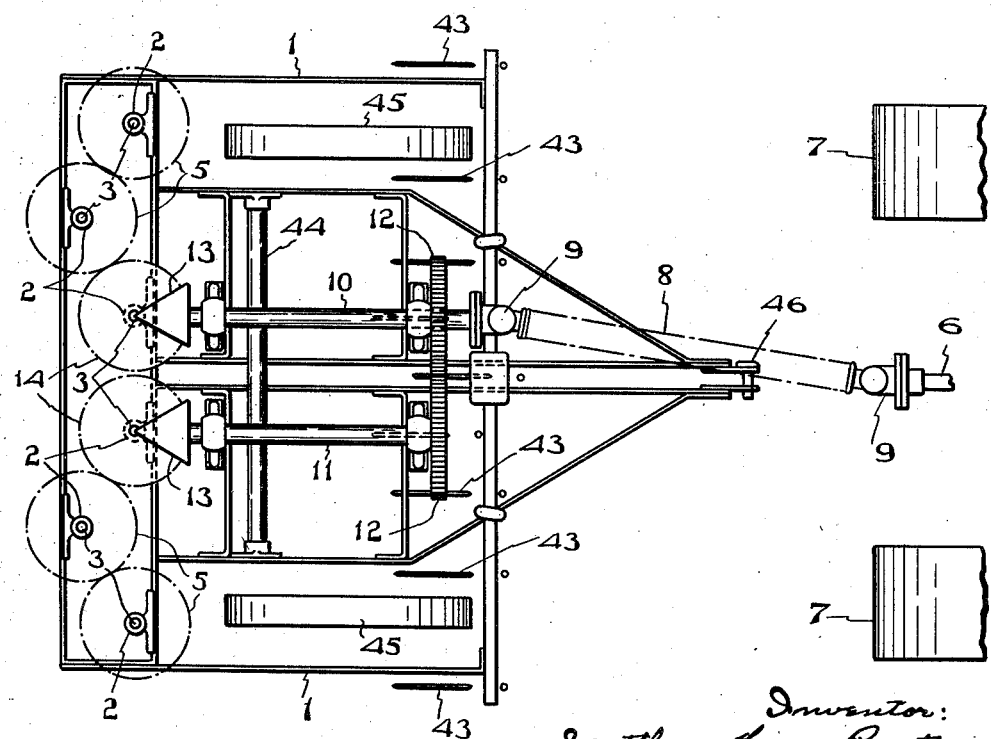

In Figs. 1 and 2 a frame 1 is shown provided with a number of spaced vertical bearings 2 arranged across the frame in staggered formation. If desired the bearings 2 may be placed in alignment in V formation or other arrangement and ball and/or roller bearings may be inserted therein.

The shaft 3 of a tilling tool 4 is mounted in each bearing 2 and means are provided for transmitting motion from one tool 4 to another tool 4. As shown each tool shaft 3 carries a spur gear wheel 5 in mesh with one another so that adjacent pairs of tool shafts 3 rotate in opposite directions inwardly and towards each other. Chains and chain wheels may be employed for driving the tilling tools 4 and either the gear wheels 5 or chains and chain wheels may be adapted to transmit the same speed to each tool or the speed of one or more tools may be different to the rest. Several definite speeds may be transmitted to each tool 4 by the use of a gear-box construction, or a variable gear ratio. Also any desired tool may be made removable by detachably connecting the tool shaft 3 to its driving gear wheel 5 (or chain wheel) or the tool 4 to its shaft 3.

Motion may be transmitted to the tilling tools 4 from a power take off shaft 6 on the tractor 7 through a shaft 8, provided at its ends with universal joints 9, to one of dual lay shafts 10 and 11 which are each provided with a spur gear wheel 12 to transmit the power from one to the other. The rear end of each lay shaft 10 or 11 is furnished with a bevel wheel 13 which meshes with a bevel wheel 14 fitted to the upper end of one of the centre tool shafts 3. Alternatively a single shaft 10 may replace the dual lay shafts 10, 11.

The tilling tools may assume a variety of forms and comprise fixed or removable tines carried directly or indirectly by the tilling tool shafts 3. For example, the tilling tools shown in Figs. 1, 3 and 4 comprise tines 15 removably secured to a tine barrel 16 of circular (or other) formation, made in sections, with parallel sides. The barrel 16 may be modified by making its sides of tapered or curved formation. Further it may be constructed in one piece instead of sections. Slots or recesses 17 for receiving the tines 15 are furnished in different planes at equal (or unequal) distances apart and about the barrel so that the tines 15 may project laterally and cut the soil in a substantially horizontal plane or approximately parallel to the land surface. The tines 15 are secured by bolts 18 and are capable of being interchanged relative to other tools and positions for obtaining different tilths of the soil. When secured in multiples as shown, the tines 15 space the sections of a tine barrel 16 apart when the complete barrel and tines are bolted together in one unit ready for attachment to a tilling tool shaft. This ensures a firm grip upon the tines when in position. Each tine barrel 16 is mounted on a tool shaft 3 so as to be rotatable therewith and for this purpose the lower portion of the shaft may be of square section as shown or a key and keyway may be employed. The barrel is retained on the shaft 3 by passing bolts 19 vertically up through the barrel 16 and the driving wheel 5 whereby the barrel is suspended from such wheel but held firmly against the end of the spacing sleeve $3^a$ in a manner which affords easy removal. Alternatively the barrel 16 may be held in position by means located below the barrel such as a nut, a collar, a transverse pin or the like.

The tines 15 are of curved formation with a leading knife edge 20 but may be of straight, cranked, or other formation with or without a leading knife edge and with or without renewable points.

In Fig. 5 three tines 15 are formed as one unit with a central plate 21 which is shown slotted at 22 for the entrance of the tool shaft. The three tines 15 are all adapted to work in the same horizontal plane and are mounted in position by simply inserting the plate 21 between two sections (or placing it against one face of a section) of the barrel until the tool shaft 3 is located within the slot 22 in alignment with the axis of the plate 21 when the bolts 18 are tightened up. Alternatively a central hole may replace the slot 22 but this entails the removal of the various sections of the barrel 16 for mounting the tines in position.

In Fig. 6 a modified tine 23 comprises a sawlike element capable of being mounted on a tool shaft 3 between sections of a barrel 16. A tine may have three (more or less) cutting elements or prongs 24 as shown in Fig. 7 which may be of straight, curved, cranked or other formation made of the same or different lengths and located in vertical alignment, staggered, or distributed so as to be radial or otherwise with respect to a tilling tool shaft 3.

In Figs. 8 and 9 the barrel 25 is shaped to provide a series of vertical cutting blades 26 (four are shown) which are set at an angle to the axis of the barrel and carried by arms 27. The blades 26 may be inclined or of spiral formation if desired.

In Fig. 10 a tilling tool 28 is made of propeller formation with the blades or tines 29 twisted, curved and shaped to cut, disintegrate, and throw soil towards the rear of a machine when such tools are rotating side by side inwardly and towards each other, and made to lift or lighten the soil.

The tool shown is suitable for insertion between or substitution for any of the sections of a barrel 16. Alternatively the tines 29 may be adapted for removable attachment to a barrel 16 or formed thereon.

In Figs. 11 and 12 the barrel 16 is formed in one piece with the lower portion of the tool shaft 3 and furnished with lateral tine carriers 30 onto which the recessed ends of the tines 31 may be readily passed and secured by pins or the like. To prevent a tilling tool being broken or deformed by rock, large stones, buried roots or like obstructions a division 32 is provided in the tool shaft as shown. A pair of flanges 33, 34 are formed respectively on the two portions of the tool shaft 3 with a centre pin 35 on one portion adapted to enter a recess in the other portion for aligning such portions. The flanges 33, 34 are then held in abutment by means of a shear bolt 36 (two or more may be used if desired) which is capable of being sheared in two parts when any excessive strain is caused by the rotation of the tool shaft 3 being impeded by an obstruction.

The above construction for preventing the breaking or deforming of tilling tools may be applied to any arrangement other than that wherein the bolts 19 pass up through the gear wheel 5. Such bolts 19 will require to be passed through the lower flange 34 which could be enlarged beyond the periphery of the upper flange 33 for receiving the bolts 19. Alternatively the aforesaid nut or transverse pin arrangement below the barrel 16 may be employed, or the barrel made integral with the shaft.

To prevent straining of the main tiller frame 1 when working on uneven land and to obtain an equal depth of work, spring or other resilient means may be inserted in a convenient position between the tines or tilling tools and the frame 1 so as to allow movement in a vertical and/or rotary direction. For vertical resilience, a spring may be located between the barrel 16 (or collar on the tool shaft) and the tiller frame 1, the bearings 2 or the driving gear wheel 5. A convenient arrangement is to substitute a spiral spring for the spacing sleeve 3ª (Fig. 3) on the shaft 3. For rotary resilience, spring steel tines of any convenient section may be employed to further disintegrate the soil or the construction shown in Figs. 13 and 14 is employed wherein the tines 37 are pivoted at 38 to a barrel 16 with springs 39 behind the tines to afford resilience. Alternatively, the barrel and tines as a unit may by allowed a limited resilient movement about the tool shaft 3 by mounting the barrel 16 rotatably on the shaft under the control of a spring or springs.

In Figs. 15 and 16, tilling tools 40 are shown directly furnished with integral tines 41 and adapted to be attachable to tool shafts 3 by means of flanges 34 having centre pins 35 and holes for the passage of shear bolts 36. If desired each tool may be integral with a tool shaft 3. Each tool 40 is formed with three tines 41 of which the lowest is made by turning the lower end of the tool at right angles to the shaft 3. In Fig. 15 the tool 40 is of straight formation and in Fig. 16 the tool 40 is cranked outwards at 42 but a tool may be inclined, curved or cranked for the whole or a portion of its length. Any number of projecting tines 41 of the same or varying lengths or sizes can be formed on or fixed to the tool 40 and furnished with spade or other shaped ends and/or short tines in its length. In Figs. 17 and 18 a plurality of tines 41 are spaced apart in the working depth of the tilling tool 40 and projecting laterally at four radial points. The construction is such that tines 41 diametrically opposite to one another alternate in the working depth. The tool is provided with a centre pin 35 and a hole for a shear bolt 36.

Where more than one tine is provided these may be made equidistant circumferentially and vertically as may be desired to give equal tilth throughout the depth worked; or they may be at varied distances to give different tilths in the upper and lower layers of the soil.

If so desired a screw thread formation or a plurality of spaced discs may be used. Also the soil when cultivated may be of various grades by using tools each with different tines or different tools in the several bearings 2.

To prevent weeds and other growths or rubbish winding around the tine barrels 16 and tines, disc coulters 43 of a known type are fitted across the machine ahead of the tilling tools to cut the weeds or rubbish into short lengths.

Machines hauled by animals, tractors or cables may be of the variety having two or more wheels, rollers, skids or endless tracks and the power source for driving the tilling tools may also raise and lower them from and to their working positions. A known type of lifting gear indicated by 44 is fitted to the tilling machine wheels 45 for lifting the implement out of work and lowering it into work to a desired depth about its pivotal anchorage 46 (or front carrier wheels when employed). The pivotal anchorage 46 is shown adjustable to allow a slight inclination of the tines to be obtained for certain types of soil.

In a modified construction power to drive the tilling tools is obtained from one or more of the tilling machine wheels 45 through driving sprockets and chains to a first motion shaft and by similar means to a second motion shaft upon which a bevel wheel or wheels 13 is or are mounted so as to engage with the bevel wheel or wheels 14 carried by the tilling tool shafts 3. If so desired spur gearing may be used in combination with the chain drive and employed for driving the first motion shaft.

In self-propelled machines motion may be transmitted to the tilling tool shafts 3 from the wheels 45, the main power unit or other desired part of the machine through suitable mechanism. The tilling machine frame may be pivotally anchored to the main frame to permit of it being mechanically or otherwise lowered into and out of its working position, and one or more adjustable carrier wheels, rollers or skids are fitted to ensure even depth of work.

In any of the before named constructions the tilling tools may be arranged to rotate all in one direction, in opposite directions, or alternatively in any desired combination of directions and speeds. Also the tools may work at greater speed than hitherto with a resultant increase in both mechanical and cultivating efficiency.

A tilling machine constructed as herein described can be adapted to work in rows of growing crops by removing one or more tilling tools. Such machine affords interchangeability of the tilling tools and/or tines and may also have land pressing machines, sub-surface packers, harrows, drills and the like attached to its rear. If so desired, the means following the tilling tools may be in the form of a guard member placed transversely across the rear of the machine for levelling any ridges created by the tools. The member may be adjustable to the soil level and may carry deflecting blades to assist the levelling action. Further, the whole construction allows the tilling tools to be in line across the machine or in a substantially compact space (from front to rear of the machine) with adjustable land wheels in close proximity thereto for ensuring positive control of the depth of working.

What I claim is:—

1. A rotary tilling machine comprising a frame, a plurality of pendant tool shafts rotatably mounted in bearings on said frame at their upper ends, a plurality of horizontally projecting tines located in each of a number of substantially horizontal planes and providing tilling tools, said bearings being arranged transversely across the frame, land wheels on which the frame is adjustably mounted to control the depth the tilling tools enter the soil and to set the said tines to the required working plane, and means for rotating adjacent tool shafts in opposite directions to throw the soil rearwardly and outwardly with a substantially fan-like distribution.

2. A rotary tilling machine as in claim 1 wherein the tilling tools are arranged in two groups one at either side of the longitudinal axis of the frame, the shaft of each tool being provided with a gear in mesh with a gear of an adjacent shaft of its group and one shaft of each of the groups being provided with a bevel gear, and wherein each of a pair of intergeared longitudinal driving shafts is provided with a bevel gear for mesh with one of the said bevel gears on the tool shafts.

3. A rotary tilling machine comprising a frame adapted to be drawn by a power tractor, a plurality of groups of pendant tool shafts rotatably mounted in bearings on said frame at their upper ends, a plurality of horizontally projecting tines located in each of a number of substantially horizontal planes and providing two groups of tilling tools, said bearings being arranged transversely across the frame, a gear on each tool shaft adapted to mesh with a gear of an adjacent shaft of its group, a bevel gear on one tool shaft of each group, a longitudinal driving shaft for each group having a bevel gear arranged to mesh with the bevel gear of the associated tool shaft, gearing connecting said longitudinal driving shafts, and means for rotating said longitudinal driving shafts from said power tractor.

4. A rotary tilling machine as in claim 3, wherein the frame is connected to the tractor by means of an adjustable anchorage permitting the frame to be inclined for imparting a desired inclination to the normally horizontal tines of the tilling tools.

5. A rotary tilling machine as in claim 1, wherein the tilling tooth shaft is provided with shear means adapted to be sheared in two parts when subjected to excessive strains so as to ensure automatic disconnection of the tilling tool when obstructed.

6. A rotary tilling machine as in claim 1, wherein the tilling tool shaft is provided with shear means adapted to be sheared in two parts when subjected to excessive strains so as to ensure automatic disconnection of the tilling tool when obstructed, said shear means comprising shear bolts which clamp together the flanges joined to alined parts of the tool shafts and which also serve to allow quick detachment of a tilling tool from its shaft.

MATTHEW HENRY ROYSTON.